(12) United States Patent
Shiel

(10) Patent No.: US 11,267,058 B2
(45) Date of Patent: Mar. 8, 2022

(54) TABLE SAW INCLUDING TIP-IN TABLE EXTENSION

(71) Applicant: Robert Bosch GmbH, Stuttgart (DE)

(72) Inventor: William Shiel, Bartlett, IL (US)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 16/775,330

(22) Filed: Jan. 29, 2020

(65) Prior Publication Data

US 2021/0229195 A1 Jul. 29, 2021

(51) Int. Cl.
*B23D 47/02* (2006.01)
*B23Q 1/00* (2006.01)
*B27B 27/10* (2006.01)
*B27B 27/04* (2006.01)

(52) U.S. Cl.
CPC ......... *B23D 47/025* (2013.01); *B23Q 1/0063* (2013.01); *B27B 27/04* (2013.01); *B27B 27/10* (2013.01)

(58) Field of Classification Search
CPC ..... B23D 47/025; B23D 45/06; Y10T 83/773; Y10T 83/727; B23Q 1/74; B23Q 1/0063
USPC ........... 144/286.1, 287; 108/64, 65; 403/353
See application file for complete search history.

(56) References Cited

U.S. PATENT DOCUMENTS

| | | | | |
|---|---|---|---|---|
| 534,507 A * | 2/1895 | Hoagland | .................. | F16B 7/22 403/353 |
| 715,976 A * | 12/1902 | Carolan | .................... | F16B 7/22 403/353 |
| 730,186 A * | 6/1903 | Case | .......................... | F16B 7/22 403/353 |
| 4,350,193 A * | 9/1982 | McCambridge | ..... | B23D 47/025 108/159 |
| 4,726,405 A * | 2/1988 | Bassett | ................ | B23D 47/025 108/59 |
| 4,797,021 A | 1/1989 | Stamper | | |
| 4,955,941 A | 9/1990 | Rousseau | | |
| 5,144,888 A * | 9/1992 | Heine | ................... | A47B 87/002 108/64 |
| 5,277,132 A * | 1/1994 | Korb | ....................... | A47B 17/00 108/64 |
| 5,588,771 A * | 12/1996 | Scott | ....................... | E21B 17/04 403/102 |

(Continued)

FOREIGN PATENT DOCUMENTS

WO 2015094953 6/2015

OTHER PUBLICATIONS

DE Office Action for DE 102021200670.1.

*Primary Examiner* — Laura M Lee
(74) *Attorney, Agent, or Firm* — Kelly McGlashen; Maginot, Moore & Beck LLP

(57) ABSTRACT

A table saw includes a table work surface, main rails supported on opposed sides of the table work surface, and a fence mounted on the main rails so as to be slidable relative to table work surface. The table saw also includes an extension assembly having extension rails that support an extension work surface and connector assemblies that couple the extension rails to the main rails. The main rails together with the extension rails provide a continuous fence contact surface that extends along the entire length of the table top and the extension assembly. The connector assemblies each include a hook that engages with a latch plate, and the hook is assembled with the latch plate via a pivoting action.

21 Claims, 10 Drawing Sheets

(56) References Cited

U.S. PATENT DOCUMENTS

| | | | |
|---|---|---|---|
| 6,439,280 B1 * | 8/2002 | Wang | B23D 47/025 |
| | | | 108/64 |
| 6,446,413 B1 * | 9/2002 | Gruber | A47G 27/0237 |
| | | | 52/127.7 |
| 7,210,180 B2 * | 5/2007 | Malcolm | A61G 13/10 |
| | | | 5/621 |
| 8,966,687 B2 * | 3/2015 | Wilson | A61B 6/0442 |
| | | | 5/613 |
| 8,967,027 B2 | 3/2015 | Koegel | |
| 9,121,421 B2 * | 9/2015 | Huggler | F16B 5/0628 |
| 9,527,144 B2 | 12/2016 | Frolov | |
| 10,321,761 B1 | 6/2019 | Lai et al. | |
| 10,442,106 B2 * | 10/2019 | Gass | B23D 47/025 |
| 10,702,933 B2 * | 7/2020 | Koegel | B25H 1/10 |
| 2003/0075033 A1 | 4/2003 | Speakman | |
| 2005/0081295 A1 * | 4/2005 | Malcolm | A61G 13/10 |
| | | | 5/624 |
| 2015/0273723 A1 * | 10/2015 | Gass | B27B 27/02 |
| | | | 83/438 |
| 2019/0308258 A1 | 10/2019 | Shiel et al. | |

\* cited by examiner

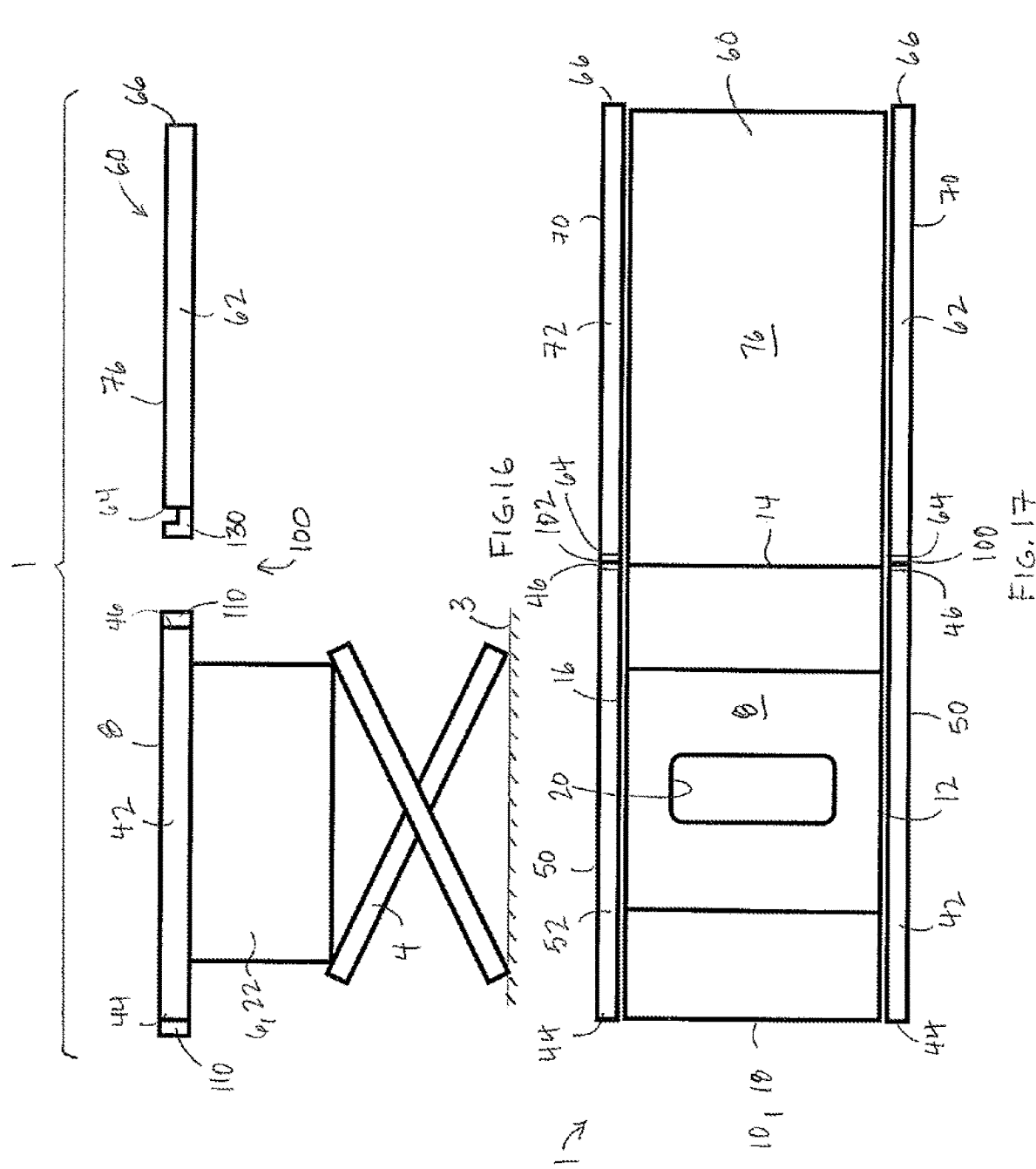

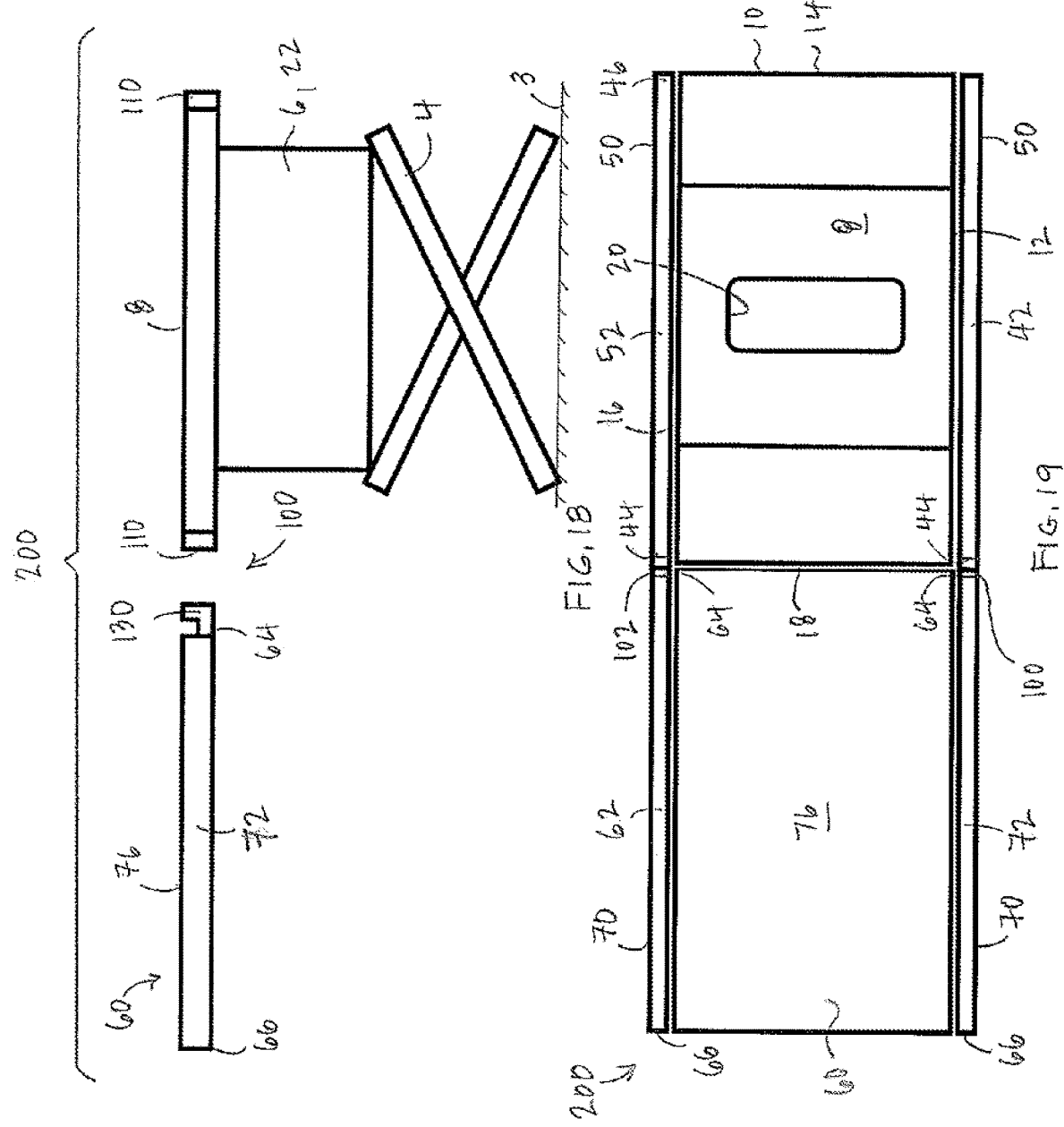

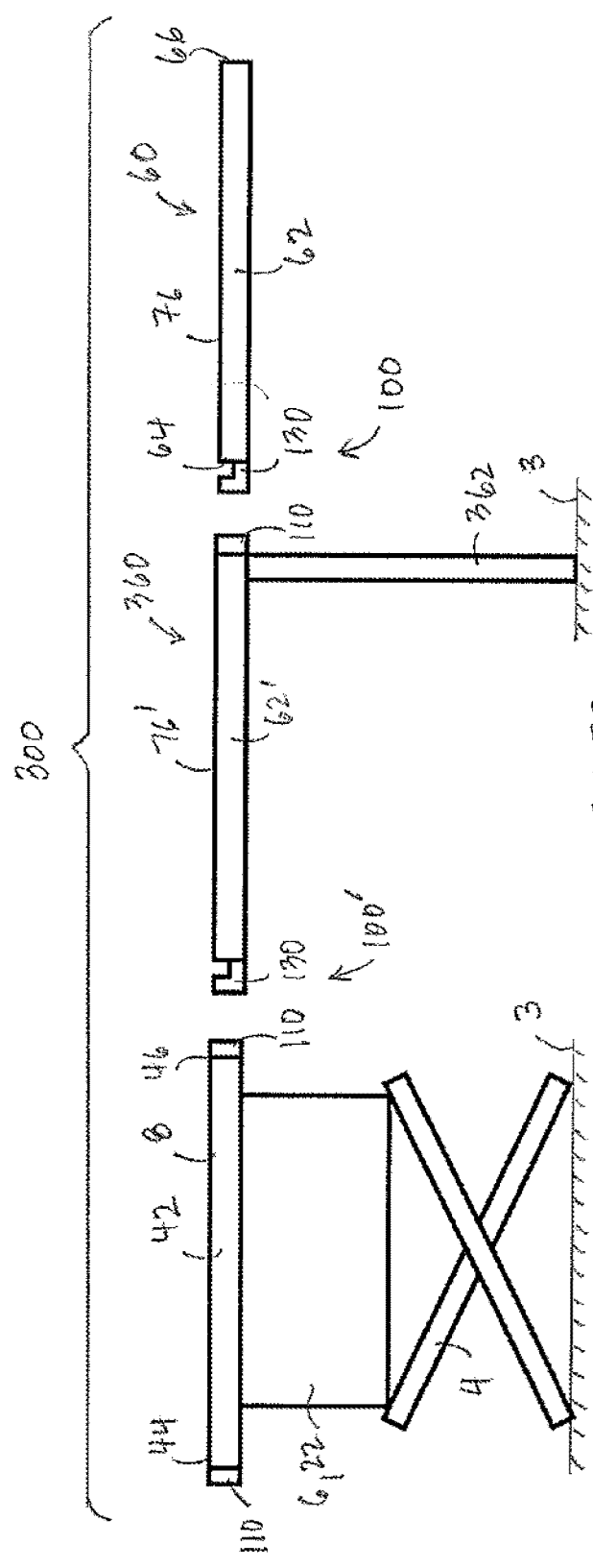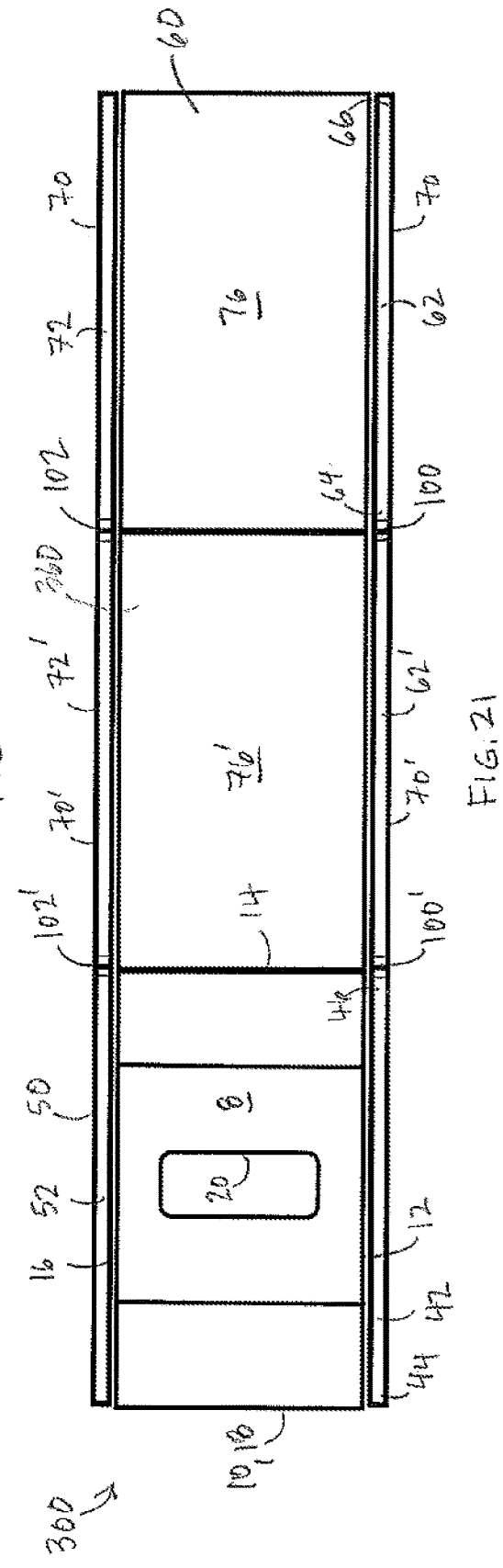

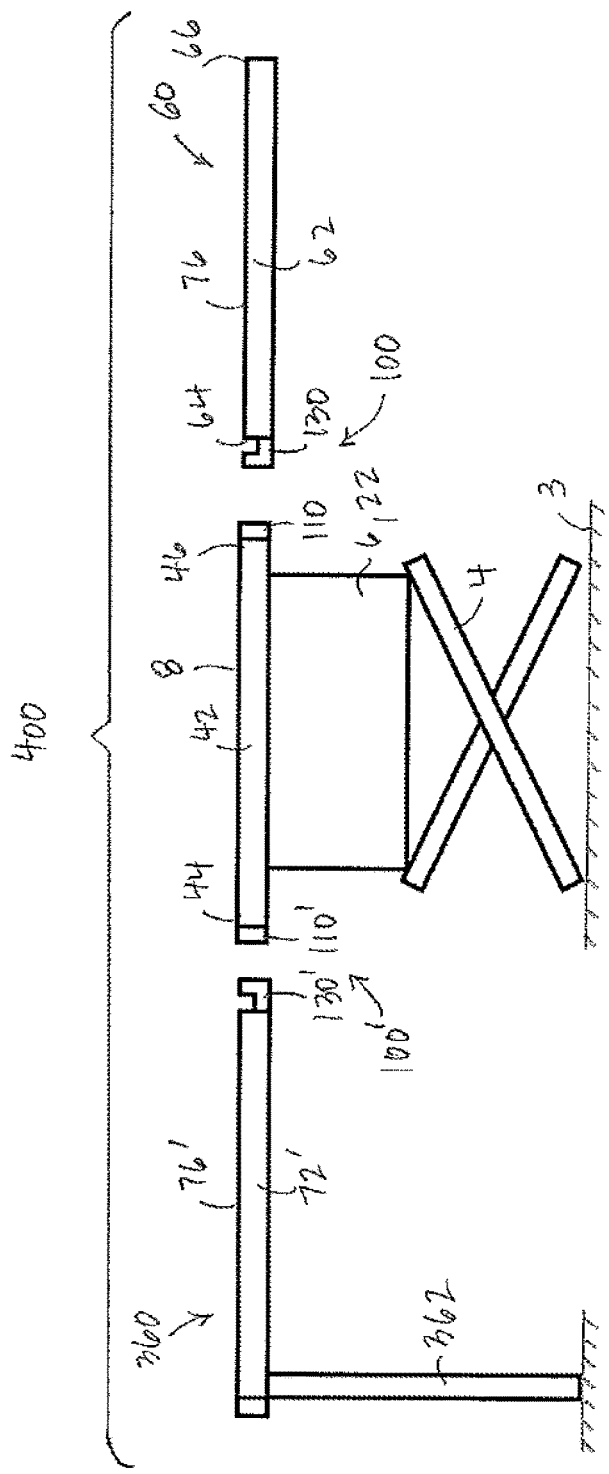
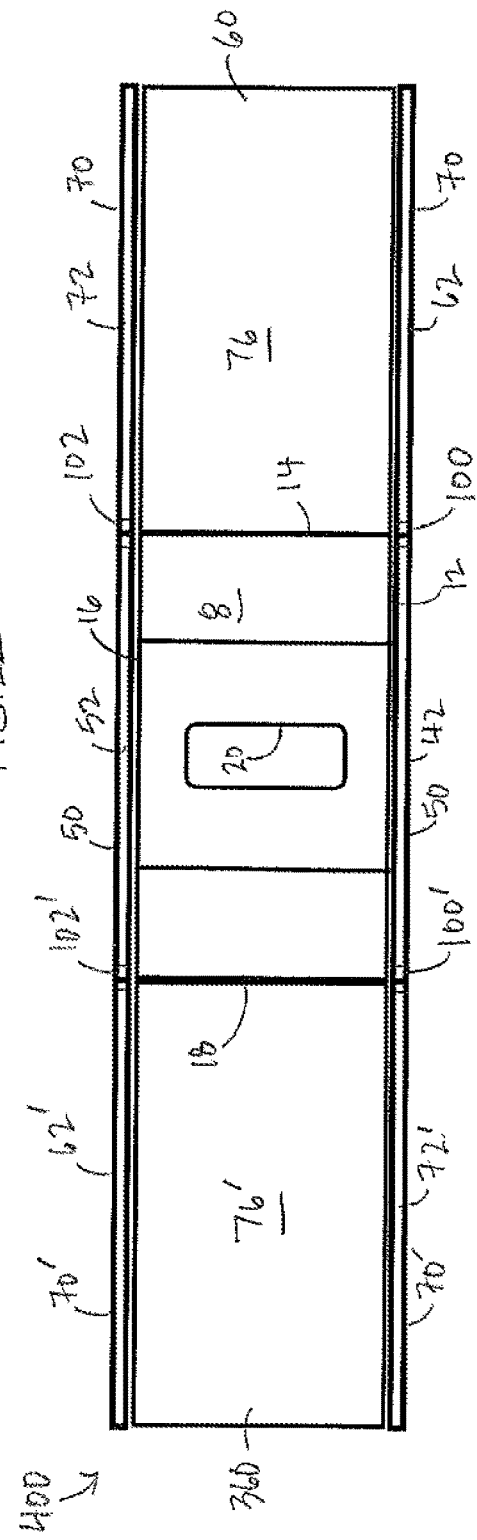

TABLE SAW INCLUDING TIP-IN TABLE EXTENSION

BACKGROUND

Table saws of various designs include a frame and an upward-facing work surface having an opening through which a blade extends. The work surface supports a material, such as wood, as it is pushed towards the blade for cutting. Table saws have traditionally been stand-alone pieces of equipment that are used in workshops. Because most stand-alone table saws are used in large open spaces, the dimensions of the table saw including the work surface can be large enough to support materials of various sizes for cutting. However, since such table saws are large in size and mass, they are not readily moved from one location to another. At construction sites, it is useful to have a table saw that can be easily moved from one location to another or between different construction sites. Accordingly, smaller and portable table saws have been designed. The portable table saws use lighter materials and the dimensions of the frame and the work surface are reduced to reduce the size and weight of the table saw, thereby allowing portability.

Table saws may include a movable fence that is supported on rails disposed on opposed sides of the work surface. The fence provides a guide surface against which material to be cut is positioned. During a cutting operation, the material rests on the work surface while sliding along the fence as the material is cut by the saw blade. Since the fence is arranged perpendicular to the work surface and is aligned generally parallel to the blade, the fence enables the table saw to provide cuts that are accurate, straight and reproducible. The fence can be positioned relative to the work surface by sliding the fence along the rails to a desired spacing from the blade, and securing the fence in a desired position using a locking mechanism.

A dimension of a cut in a material is determined by a distance of the fence from the blade, and thus a maximum cutting dimension (e.g., saw capacity) of a table saw is limited by the distance from the blade that the fence can be positioned, which is in turn limited by the length of the rails. Due to their relatively small size, portable table saws may have relatively short rails and thus are often associated with having relatively small saw capacity. It is desirable to provide a portable table saw that provides a relatively large saw capacity.

SUMMARY

In some aspects, a connector assembly is configured to connect au end of a first rail to an end of a second rail. The connector assembly includes a latch plate that is disposed on an end face of one of the first rail and the second rail; and a hook that protrudes from an end face of the other of the first rail and the second rail. The hook includes a curved protrusion. The protrusion engages a rail-facing surface of the latch plate in such a way that the hook is retained on the latch plate, and a longitudinal axis of the second rail is parallel to a longitudinal axis of the first rail.

In some embodiments, the latch plate includes a latch plate opening, and the hook includes a mounting plate that is secured to the end face of the other of the first rail and the second rail. In addition, the protrusion protrudes from the mounting plate, extends through the latch plate opening and engages the rail-facing surface of the latch plate.

In some embodiments, the protrusion is configured so that when the protrusion is engaged with the latch plate, a portion of the mounting plate abuts a portion of the latch plate and a portion of the protrusion abuts a portion of the latch plate opening.

In some embodiments, the portion of the mounting plate, the portion of the latch plate, the portion of the protrusion and the portion of the latch plate opening each comprise a two dimensional surface.

In some embodiments, the latch plate includes a hook-facing surface and a first rail-facing surface that is opposed to the hook-facing surface. The first rail-facing surface abuts the end face of the one of the first rail and the second rail. The latch plate includes a latch plate peripheral edge that extends between the hook-facing surface and the first rail-facing surface. IN addition, the latch plate includes the latch plate opening that extends between the hook-facing surface and the first rail-facing surface and is surrounded by the latch plate peripheral edge. The mounting plate includes a latch plate-facing surface, and a second rail-facing surface that is opposed to the latch plate-facing surface. The second rail-facing surface abuts the end face of the other of the first rail and the second rail. In addition, the mounting plate includes a mounting plate peripheral edge that surrounds the protrusion and extends between the latch plate-facing surface and the second rail-facing surface.

In some embodiments, the protrusion is configured so that when the protrusion is engaged with the latch plate, a portion of the latch-plate facing surface of the mounting plate abuts a portion of the hook-facing surface of the latch plate, a mounting plate-facing portion of the protrusion abuts a portion of the first rail-facing surface of the latch plate, and a portion of the protrusion abuts a portion of the latch plate opening.

In some embodiments, a latch plate-facing surface of the mounting plate includes an angled portion whereby a gap exists between the latch plate and a portion of the mounting plate.

In some embodiments, the hook comprises an assembly of the mounting plate and a catch, where the catch includes the protrusion.

In some aspects, a rail assembly includes a first rail connected to a second rail via connector assembly. The first rail includes a first rail first end, a first rail second end that is opposed to the first end first end, and a first rail longitudinal axis that extends between the first rail first end and the first rail second end. The second rail includes a second rail first end, a second rail second end that is opposed to the second rail first end, and a first rail longitudinal axis that extends between the second rail first end and the second rail second end. The connector assembly includes a latch plate that is disposed on an end face of one of the first rail and the second rail, and a hook that protrudes from an end face of the other of the first rail and the second rail. The hook includes a curved protrusion. The protrusion engages a rail-facing surface of the latch plate in such a way that the hook is retained on the latch plate, and a longitudinal axis of the second rail is parallel to a longitudinal axis of the first rail.

In some embodiments, the latch plate includes a latch plate opening, the hook includes a mounting plate that is secured to the end face of the other of the first rail and the second rail, and the protrusion protrudes from the mounting plate, extends through the latch plate opening and engages the rail-facing surface of the latch plate.

In some aspects, a table saw includes a table work surface. The table work surface includes an opening that is configured to receive a cutting blade, and a first side, a second side, a third side and a fourth side that surround the table work surface. The table saw includes a main rail supported on the first side, and an extension assembly including an extension rail and a connector assembly that is configured to couple the extension rail to the main rail. The table saw includes a fence supported on one of the main rail and the extension assembly so as to be slidable relative to the table top. The connector assembly includes a latch plate that is disposed on an end face of one of the main rail and the extension rail, and a hook that protrudes from an end face of the other of the main rail and the extension rail. The hook includes a curved protrusion. The protrusion engages a rail-facing surface of the latch plate in such a way that the hook is retained on the latch plate, and a longitudinal axis of the extension rail is parallel to a plane defined by the table work surface.

In some embodiments, the longitudinal axis of the extension rail is parallel to a longitudinal axis of the main rail.

In some embodiments, the latch plate includes a latch plate opening, the hook includes a mounting plate that is secured to the end face of the other of the main rail and the extension rail, and the protrusion protrudes from the mounting plate, extends through the latch plate opening and engages the rail-facing surface of the latch plate.

In some embodiments, the protrusion is configured so that when the protrusion is engaged with the latch plate, a portion of the mounting plate abuts a portion of the latch plate and a portion of the protrusion abuts a portion of the latch plate opening.

In some embodiments, the portion of the mounting plate, the portion of the latch plate, the portion of the protrusion and the portion of the latch plate opening each comprise a two dimensional surface.

In some embodiments, the latch plate includes a hook-facing surface, and a first rail-facing surface that is opposed to the hook-facing surface and that abuts the end face of the one of the main rail and the extension rail. The latch plate includes a latch plate peripheral edge that extends between the hook-facing surface and the first rail-facing surface, and the latch plate opening. The latch plate opening extends between the hook-facing surface and the first rail-facing surface and is surrounded by the latch plate peripheral edge. The mounting plate includes a latch plate-facing surface, and a second rail-facing surface that is opposed to the latch plate-facing surface and that abuts the end face of the other of the main rail and the extension rail. In addition, the mounting plate includes a mounting plate peripheral edge that surrounds the protrusion and extends between the latch plate-facing surface and the second rail-facing surface.

In some embodiments, the protrusion is configured so that when the protrusion is engaged with the latch plate, a portion of the latch-plate facing surface of the mounting plate abuts a portion of the hook-facing surface of the latch plate, a mounting plate-facing portion of the protrusion abuts a portion of the first rail-facing surface of the latch plate, and a portion of the protrusion abuts a portion of the latch plate opening.

In some embodiments, the table saw includes an extension work surface that is supported on the extension rail so as to be coplanar with the table work surface.

In some embodiments, the table work surface is supported relative to a support surface via a support structure, and the extension assembly includes a support leg that is connected to the extension work surface, and can be configured to extend between the extension rail and the support surface.

In some embodiments, the extension rail is cantilevered from the main rail via the connector assembly.

In some embodiments, the main rail is a first main rail, and the table saw includes a second main rail that is supported on the third side of the table work surface. The extension rail is a first extension rail, and the extension assembly includes a second extension rail. The connector assembly is a first connector assembly that couples the first extension rail to the first main rail, and the extension assembly includes a second connector assembly that couples the second extension rail to the second main rail. The second connector assembly includes a latch plate that is disposed on an end face of one of the second main rail and the second extension rail. In addition, the second connector assembly includes a hook that protrudes from an end face of the other of the second main rail and the second extension rail. The hook includes a curved protrusion. The protrusion engages a rail-facing surface of the latch plate in such a way that the hook is retained on the latch plate and a longitudinal axis of the second main rail is parallel to a longitudinal axis of the second extension rail.

In some embodiments, the table saw includes an extension work surface that is supported on the first extension rail and the second extension rail so as to be coplanar with the table work surface.

In some embodiments, the main rail and the extension rail each comprise a contoured surface configured to engage with a rail contact surface of the fence. A peripheral edge of each of the latch plate and the mounting plate includes a contoured portion having the same profile as the contoured surface of the main rail and the extension rail, and the contoured portion of the latch plate and the mounting plate peripheral edge cooperate with the contoured surface of the main rail and the extension rail to provide a continuous fence contact surface that is configured so that the fence is slidable along the both the main rail and the extension rail.

In some aspects, a table saw kit includes a table saw and an extension table. The table saw includes a table work surface, the table work surface including an opening that is configured to receive a cutting blade, a first main rail supported on one side of the table work surface, and a second main rail supported on a second side of the table work surface. The second side is on a side of the table work surface that is opposed to the first side. The table saw kit includes a fence mounted on the first main rail and the second main rail so as to be slidable relative to the table work surface. The extension table includes a first extension rail, a second extension rail that extends in parallel to the first extension rail, and an extension work surface that extends between, and is supported on, the first extension rail and the second extension rail in such a way that the extension work surface is co-planar with the table work surface. The extension table includes a first connector assembly that is configured to connect the first extension rail to the first main rail. The extension table includes a second connector assembly that is configured to connect the second extension rail to the second main rail. The first connector assembly and the second connector assembly each include a latch plate that is disposed on an end face of one of the main rail and the extension rail, and a hook that protrudes from an end face of the other of the main rail and the extension rail. The hook includes a curved protrusion. The protrusion engages a rail-facing surface of the latch plate in such a way that the hook is retained on the latch plate, and a longitudinal axis of the extension rail is parallel to a plane defined by the table work surface.

In some embodiments, the extension table is cantilevered from the table saw via the first and second connector assemblies.

In some embodiments, the extension table is connected to the table saw via the first connector assembly and the second connector assembly. The table work surface is supported relative to a support surface via a support structure, and the extension table includes a support leg that is connected to the extension work surface, and can be configured to extend between the extension work surface and the support surface.

In some embodiments, the extension table is a cantilevered extension table that is cantilevered from the table saw via the first and second connector assemblies. The table saw kit includes a supported extension table that includes a third extension rail and a fourth extension rail that extends in parallel to the third extension rail. The supported extension table includes a supported extension work surface that extends between, and is supported on, the third extension rail and the fourth extension rail in such a way that the supported extension work surface is co-planar with the table work surface. The supported extension table includes a support leg that is connected to the supported extension work surface, and can be configured to extend between the supported extension work surface and a support surface. The supported extension table includes a third connector assembly that is configured to connect the third extension rail to one of the first main rail and the first extension rail, and a fourth connector assembly that is configured to connect the fourth extension rail to one of the second main rail and the second extension rail.

In some aspects, the portable table saw includes a table having a table work surface, and a pair of main rails (e.g., a front main rail and a rear main rail) supported on opposed sides of the table work surface. The main rails permit operation of a fence in the small compact size and for small rip capacities. In addition, the portable table saw includes an extension assembly that increases the operable range of the rip fence, and thus increases saw capacity. The extension assembly includes a pair of extension rails, and an extension work surface that is supported on the extension rails. The extension rails can be connected to the main rails or to extension rails of another extension assembly. The extension rails have guide surfaces for the fence which match those of the main rails. When the extension rails are connected to the main rails, the respective guide surfaces of the main rails and extension rails are continuous, and the portable table saw provides fully functional, stationary extended rails on which the fence is operable along substantially the entire length of the extended rails. The extended rails also allow for a fixed measurement scale to be used. The extension rails support the extension work surface so that it is adjacent to, and coplanar with, the table work surface. The extension rails may be easily detached from the main rails for storage when larger cut dimensions are not needed or during transportation of the portable table saw. The extended rails may be attached and detached from the main rails without using tools or fasteners.

In some embodiments, the pair of extension rails may be tethered to the table saw, while in other embodiments the pairs of extension rails may be untethered and thus completely detachable, allowing for a lighter weight table saw. Detachable, untethered extension rail pairs may benefit users who have no need for higher rip capacities as well as users who prefer to carry multiple light weight bundles.

In some embodiments, the extension rails are connected to the table saw in a cantilevered fashion. In other embodiments, the extension rails can accommodate or include independent support legs. Use of extension rails having support legs may be beneficial for very long rails. For example, by providing support legs when very long extension rails are used, a condition may be avoided in which the moment arm applied to the table saw is too large when a heavy work piece is supported and the saw table tips. In embodiments where support legs are provided, the support legs may be joined to the extension rails in a fixed position relative to the extension work surface, or alternatively may be joined to the extension work surface via a hinge or pivot pins. In still other embodiments, the support legs may be completely separable from the extension work surface. That is, the support legs may be independent parts which can be added to the extension work surface to provide support between the rails and ground.

In some embodiments, the extension assembly may include one or two support legs, whereby the extension work surface and extension rails are supported while the extension assembly is attached to the table saw. With three or more legs, the extension work surface may function as an independent work table when not needed for extended capacity and attached to the table saw.

The extension rails may be connected to main rails or to each other via a connector assembly. The connector assembly is configured to connect the extension rail end-to-end with the main rail so that it does not interfere with the travel and function of the fence. In addition, the connector assembly is configured so that the faces of the rails, which engage and guide the fence, are aligned and co-planar to each other, and so that the fence contact surfaces of each rail are aligned, whereby the fence travels smoothly and locks square for every position of the fence along the rail assembly. The connector assembly includes a latch plate that is fixed to an end surface of one of the rails to be joined (for example, the main rail) and a hook that is fixed to an end surface of the other of the rails to be joined (in this example, the extension rail). Each of the latch plate and the hook are joined to an internal surface the respective rail to avoid interference with the fence and reduce the tolerance stack up so only wall thickness variance effects contact surface alignment.

The extension rails are easy to use and can be quickly installed and removed without requiring tools. To this end, the connector assembly includes a gravity pivot hook, whereby the connection between the joined rails is reinforced by gravity and loads on the extension rails and extension work surface. Lifting the end of the extension rails counters gravity and allows extension rails to be removed. In some embodiments, a lock function may be provided that prevents accidental lifting and removal of the extension rails.

The extension rails may be mounted to either lateral side of a table saw. For example, the extension rails may be positioned on a left lateral side of the saw table, or on a right lateral side of the saw table. Additional sections can be added to further increase saw capacity.

BRIEF DESCRIPTION OF THE DRAWINGS

FIG. 16 is a schematic, exploded front view of the table saw of FIG. 1.

FIG. 17 is a schematic top view of the table saw of FIG. 1.

FIG. 18 is a schematic, exploded front view of an alternative embodiment table saw.

FIG. 19 is a schematic top view of the table saw of FIG. 18.

FIG. 20 is a schematic, exploded front view of another alternative embodiment table saw.

FIG. 21 is a schematic top view of the table saw of FIG. 20.

FIG. 22 is a schematic, exploded front view of another alternative embodiment table saw.

FIG. 23 is a schematic top view of the table saw of FIG. 22.

DETAILED DESCRIPTION

Figure 1:
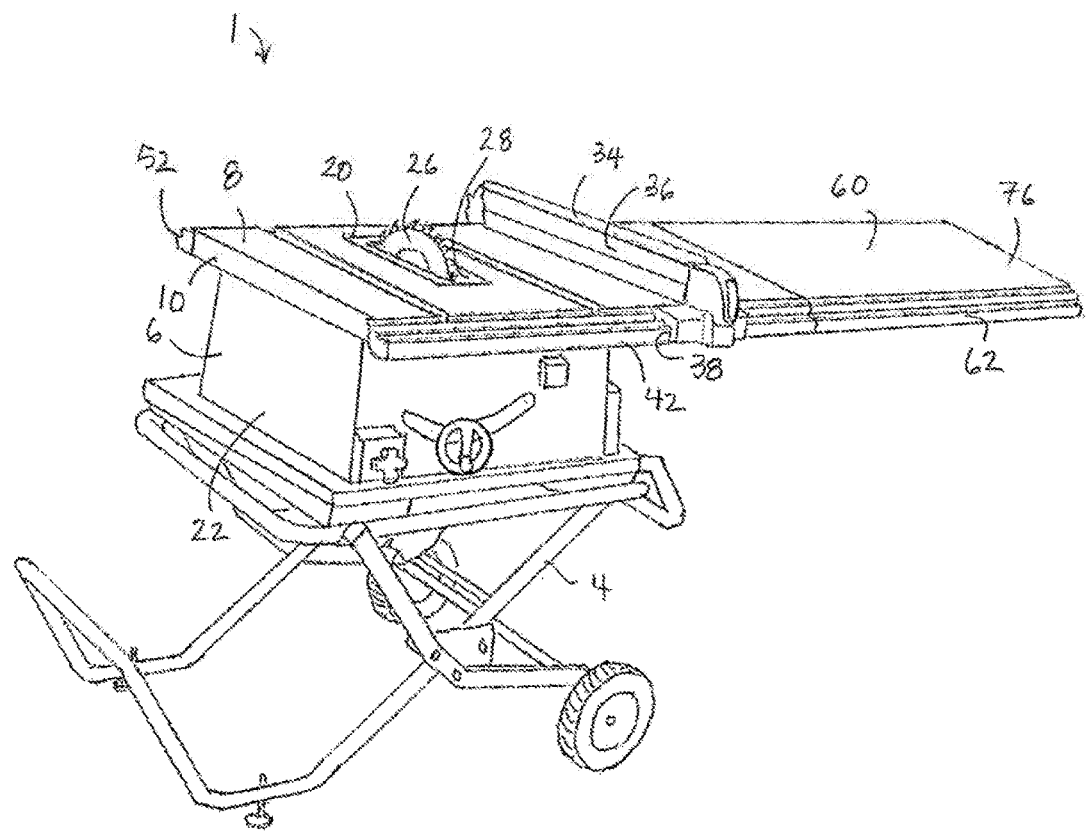
FIG. 1 is a perspective view of a portable table saw including an extension assembly.

Referring to FIGS. 1 and 16-17, a portable table saw 1 includes a table top 6 that is supported on a wheeled, foldable frame 4. The table top 6 includes a table work surface 8 that faces upward and supports material (not shown) being sawn. The table work surface 8 includes work surface opening 20 that is spaced apart from and surrounded by the peripheral edge 10. The blade 26 of the portable table saw 1, for example a circular saw blade, protrudes through the work surface opening 20, and an insert 28 is disposed in the work surface opening 20 between the blade 26 and the table work surface 8. A motor (not shown) is disposed inside the table top 6, and is configured to rotate the blade 26 within the work surface opening 20. The portable table saw 1 includes a fence 34 that is used to guide the material relative to the blade 26. The fence 34 may be supported relative to the table 2 on main rails 42, 52 that are disposed on opposed sides of the table work surface 8. In particular, the fence 34 extends over the table work surface 8 and between the opposed sides of the table work surface 8. The fence 34 includes a guide surface 36 that is perpendicular to the table work surface 8, and is aligned perpendicular to the rotational axis of the blade 26. In use, the material to be cut rests on the table work surface 8 while abutting the fence guide surface 36. The material is cut by advancing the material against the blade 26 including sliding the material over the table work surface 8 and along the fence guide surface 36. To increase saw capacity, the table saw 1 also includes an extension assembly 60 that can be easily attached to and detached from the table 2. The extension assembly 60 includes a pair of extension rails 62, 72 and an extension work surface 76 that is supported on the pair of extension rails 62, 72. The extension assembly 60 is supported on the main rails 42, 52 in such a way that the extension work surface 76 is co-planar with the table work surface 8, and such that each rail 62, 72 of the pair of extension rails extends continuously from a corresponding one of the main rails 42, 52, as discussed in detail below. In use, the fence 34 can be positioned relative to the table work surface 8 by sliding the fence 34 along the main rails 42, 52 and the extension rails 62, 72 to a desired spacing from the blade 26, and securing the fence 34 in this position using a locking mechanism (not shown).

As used herein, references to relative direction such as top, bottom, upper, lower, upward, downward, above, below, over, under, overlying, underlying, horizontal, vertical, etc., are made with respect to the orientation of the portable table saw 1 as shown in FIG. 1, and are not intended to be limiting.

The table top 6 includes housing 22 that receives the motor, and the table work surface 8 that rests on the housing 22. A peripheral edge 10 of the table work surface 8 has a rectangular profile when viewed from above (best seen in FIG. 16), and includes a first side 12, a second side 14 that adjoins the first side 12, a third side 16 that is opposed to, and parallel to, the first side 12 and adjoins the second side 14, and a fourth side 18 that adjoins the first and third sides 12, 16 and is parallel to the second side 14. The table work surface 8 has larger dimensions than the housing 22, whereby the first, second, third and fourth sides 12, 14, 16, 18 of the peripheral edge 10 are positioned outward relative to corresponding sides of the housing 22, which cooperate to support the table work surface 8.

The first and second main rails 42, 52 are supported on the table top 6. More particularly, the first main rail 42 is supported on the first side 12 of the table work surface peripheral edge 10, and the second main rail 52 is supported on the third side 16 of table work surface peripheral edge 10. The first and second main rails 42, 52 are elongated, hollow, rigid structures having an irregular cross-sectional profile. Each of the first and second main rails 42, 52 includes a first end 44, an opposed second end 46, and a longitudinal axis 48 that extends between the first end 44 and the second end 46. The first and second main rails 42, 52 extend in parallel to each other and to a plane defined by the table work surface 8. The first and second main rails 42, 52 have a length (e.g., a dimension in a direction parallel to the longitudinal axis 48) that corresponds to a length of first and third sides 12, 16. In addition, the first and second main rails 42, 52 each include a main fence contact surface 50 that faces away from the peripheral edge 10 of the table top 6. The main fence contact surface 50 has an irregular profile that is configured to engage, and slide relative to, corresponding rail contact surfaces 38 of the fence 34. The main fence contact surfaces 50 face away from, and extend in parallel to, the first and third sides 12, 16 of the table top 6.

The extension assembly 60 includes the first and second extension rails 62, 72 that support the extension work surface 76. In addition, the extension assembly 60 includes first and second connector assemblies 100, 102. The first connector assembly 100 mechanically connects the first extension rail 62 to the first main rail 42, and the second connector assembly 102 mechanically connects the second extension rail 72 to the second main rail 52.

The first and second extension rails 62, 72 are elongated, hollow, rigid structures having an irregular cross-sectional profile. Each of the first and second extension rails 62, 72 includes a first end 64, an opposed second end 66, and a longitudinal axis 68 that extends between the first end 64 and the second end 66. The first and second extension rails 62, 72 each includes an extension fence contact surface 70 having the same profile as the contact surface 50 of the first and second main rails 42, 52, which is configured to engage, and slide relative to, corresponding rail contact surfaces 38 of the fence 34.

The extension work surface 76 is a plate that extends between the first extension rail 62 and the second extension rail 72. When the first and second extension rails 62, 72 are assembled with respective first and second main rails 42, 52, the extension work surface 76 is coplanar with the table work surface 8, and supports material to be cut that extends beyond the table work surface 8. In the illustrated embodiment, the extension work surface 76 is provided as a single piece, and has a length that corresponds to, or is slightly less than, a length of the first and second extension rails 62, 72. In other embodiments, the extension work surface 76 may be provided as a single piece having a relatively short length. In still other embodiments, the extension work surface 76 may be provided as multiple pieces that are spaced apart along the length of the first and second extension rails 62, 72.

Figure 2:
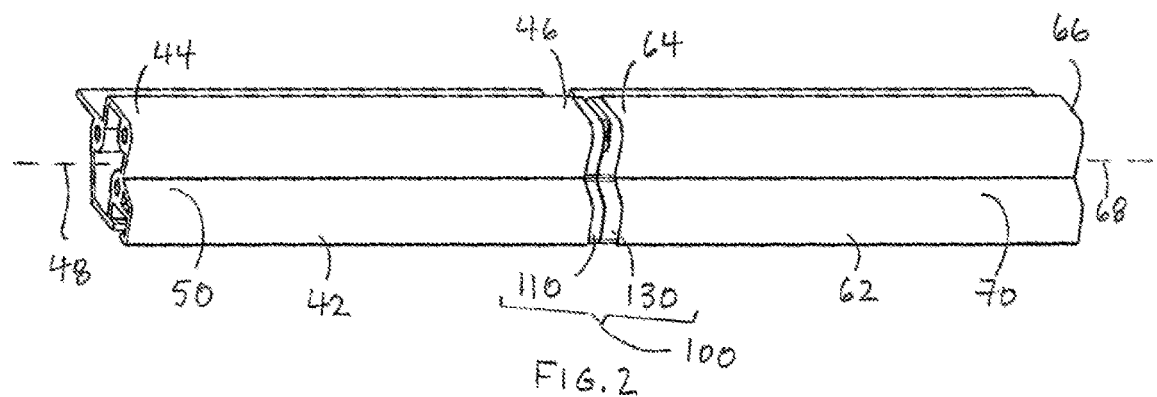
FIG. 2 is a perspective view of a portion of the rail assembly of the table saw of FIG. 1 showing the connector assembly.
Figure 3:
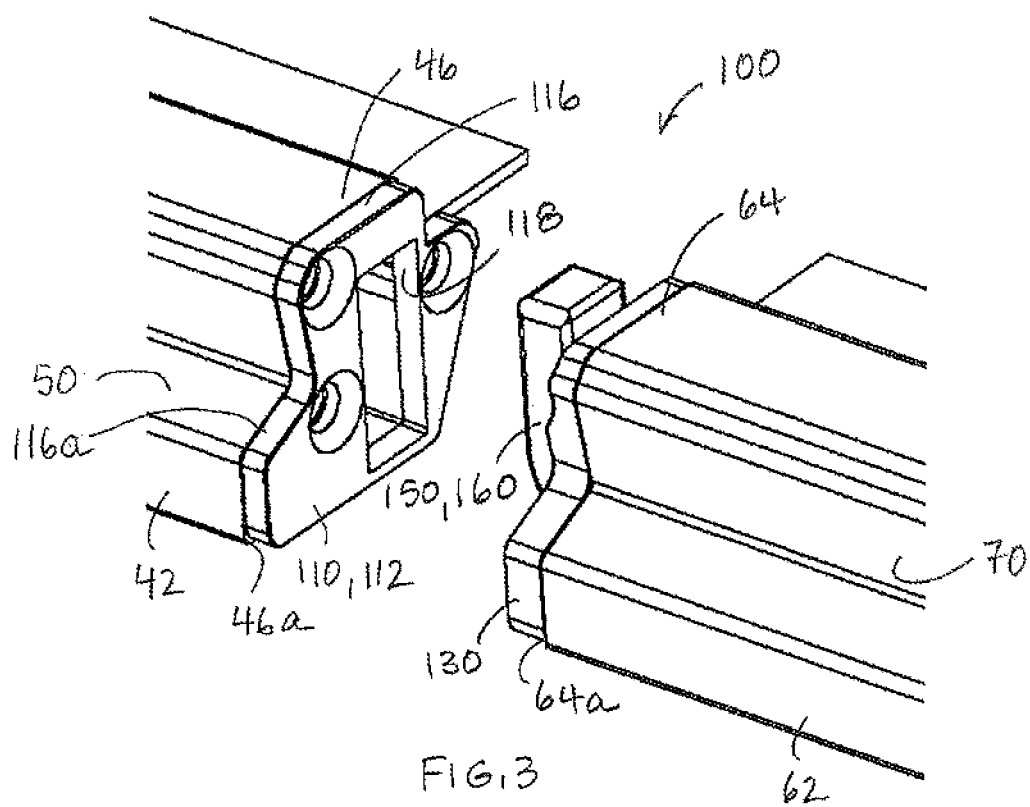
FIG. 3 is a partially exploded and enlarged perspective view of a portion of the rail assembly of FIG. 2 as seen from one perspective.
Figure 4:
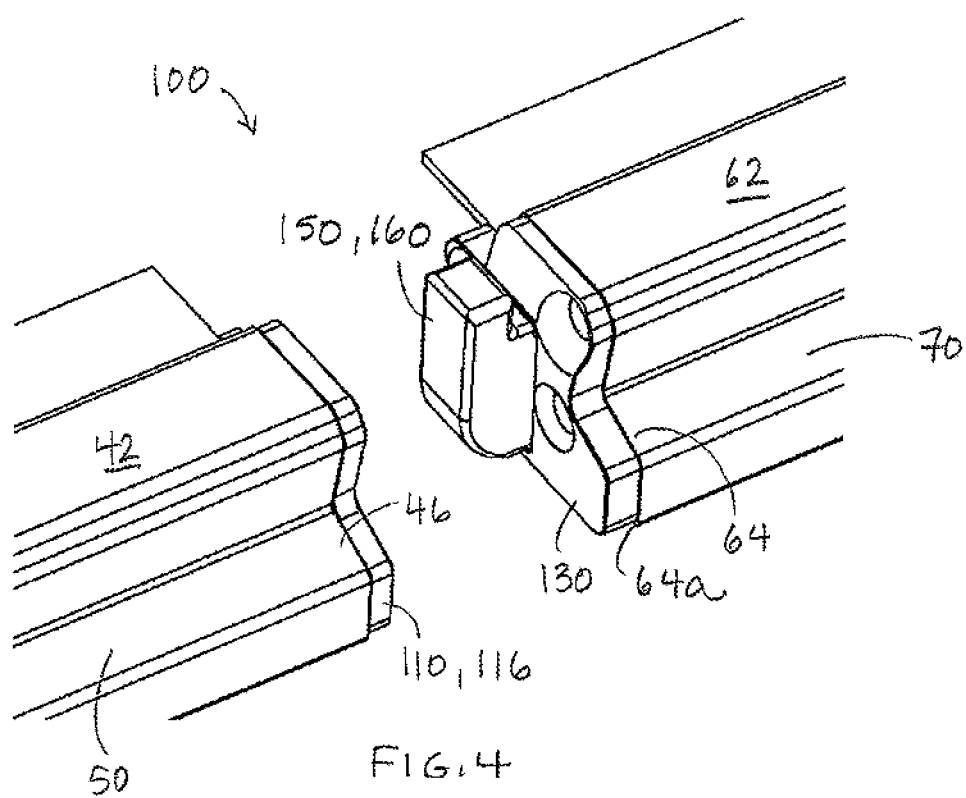
FIG. 4 is a partially exploded and enlarged perspective view of a portion of the rail assembly of FIG. 2 as seen from another perspective.
Figure 5:
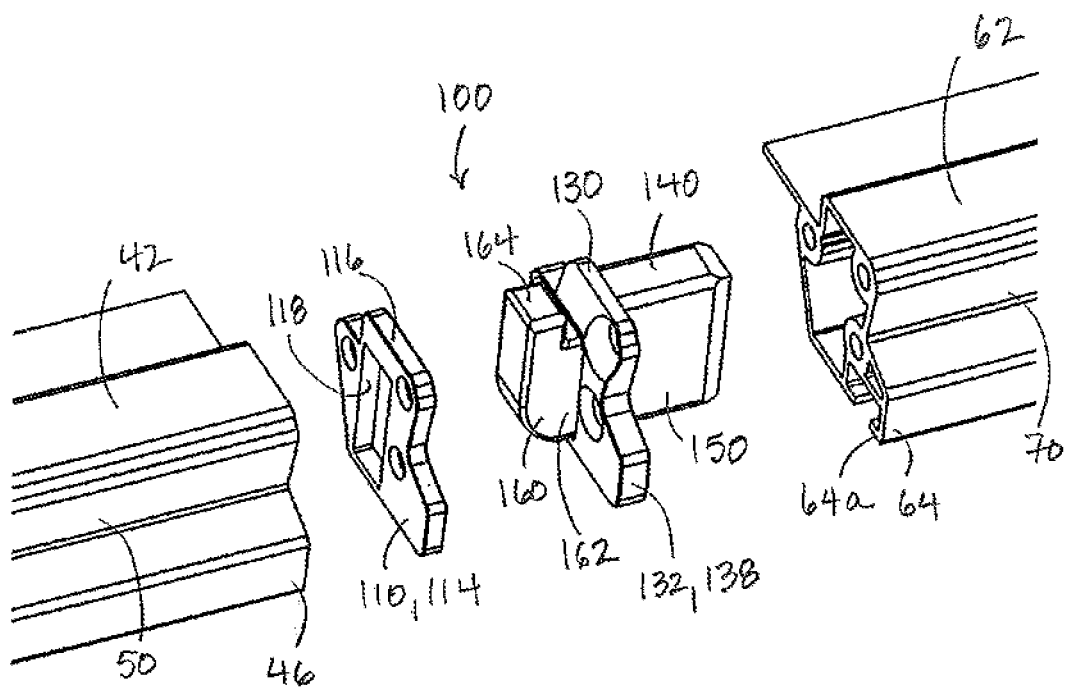
FIG. 5 is a fully exploded and enlarged perspective view of a portion of the rail assembly of FIG. 2 as seen from one perspective.
Figure 6:
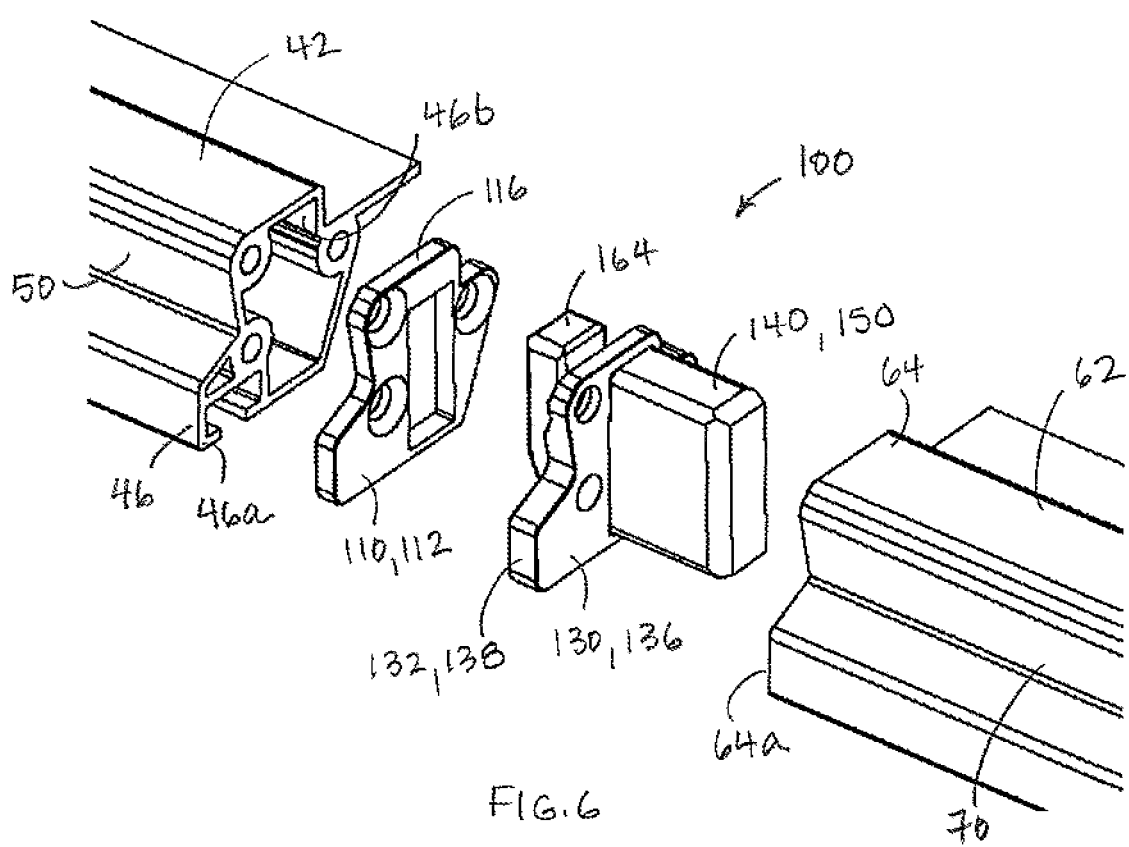
FIG. 6 is a fully exploded and enlarged perspective view of a portion of the rail assembly of FIG. 2 as seen from another perspective.
Figures 7, 8, 9:
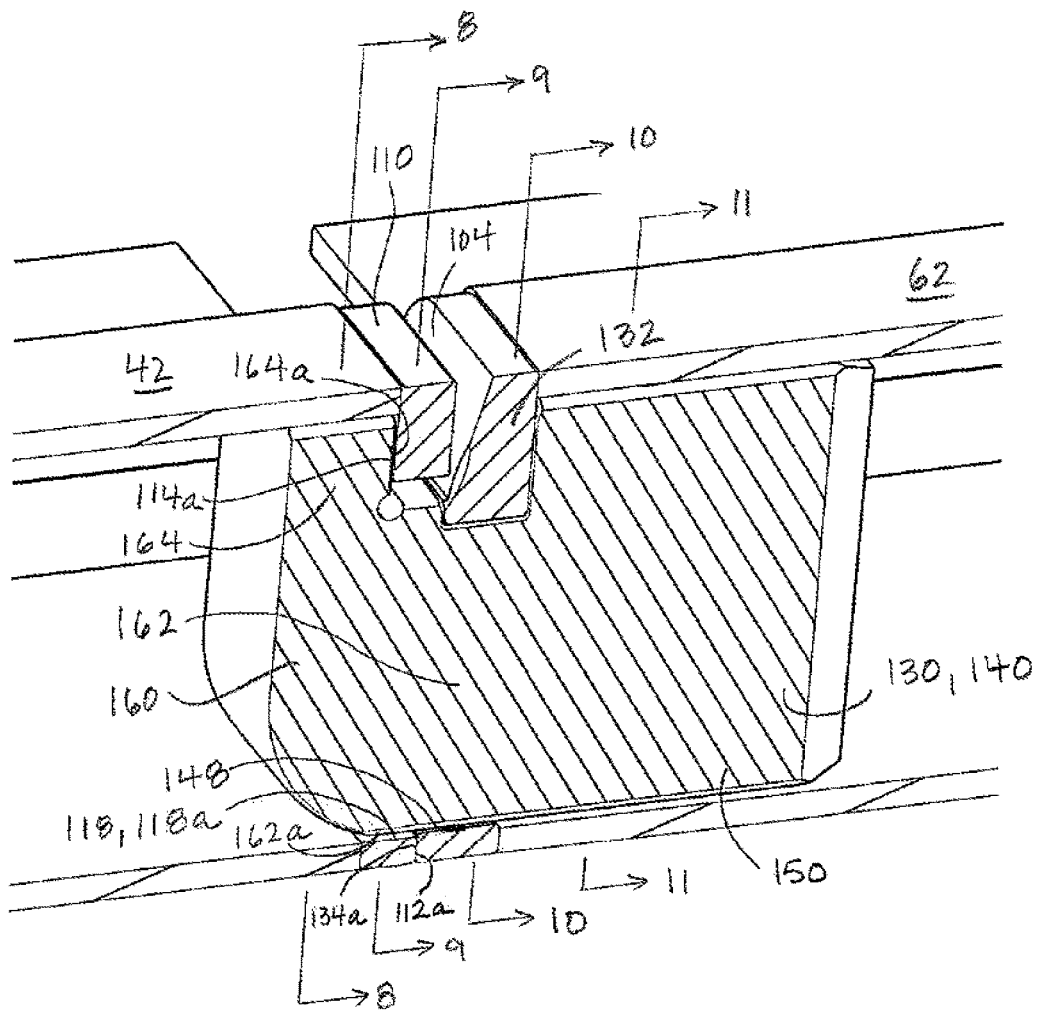
FIG. 7 is a side cross-sectional view of the connector assembly.
FIG. 8 is a cross-sectional view of the connector assembly as seen along line 8-8 of FIG. 7.
FIG. 9 is a cross-sectional view of the connector assembly as seen along line 9-9 of FIG. 7.
Figure 10:
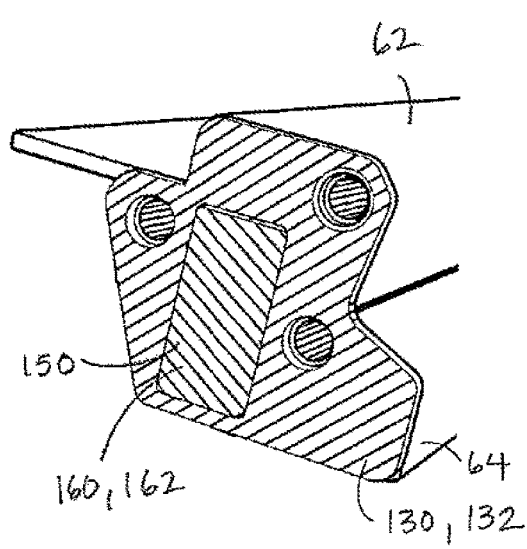
FIG. 10 is a cross-sectional view of the connector assembly as seen along line 10-10 of FIG. 7.
Figure 11:
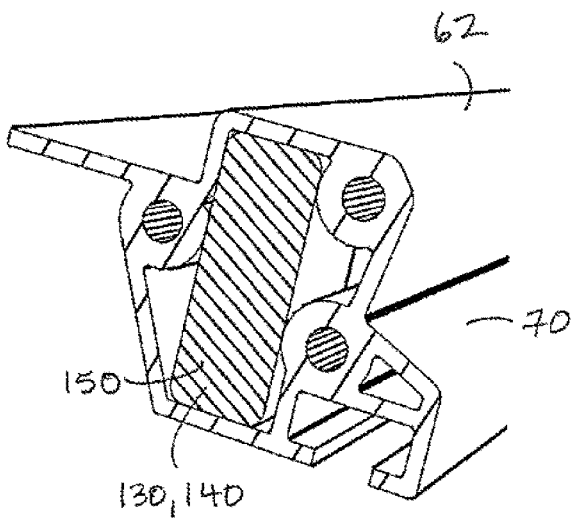
FIG. 11 is a cross-sectional view of the connector assembly as seen along line 11-11 of FIG. 7.
Figure 12:
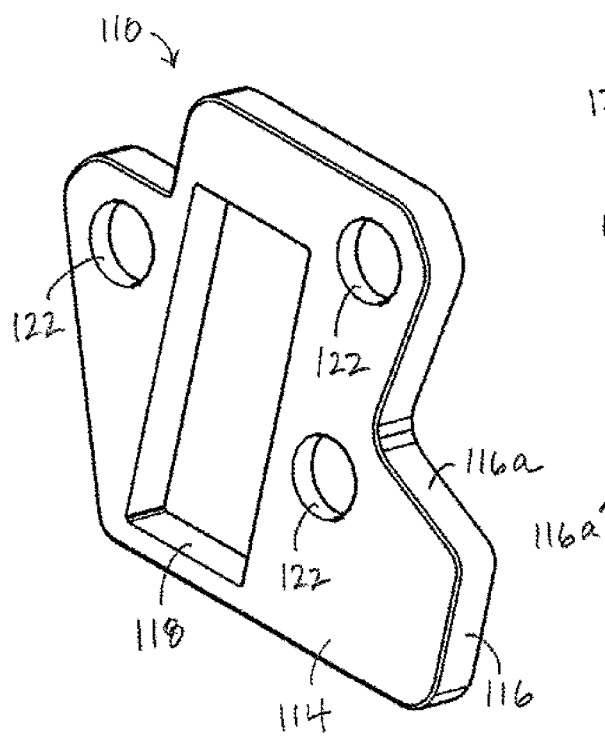
FIG. 12 is a perspective view of the latch plate of the connector assembly as seen from one perspective.
Figure 13:
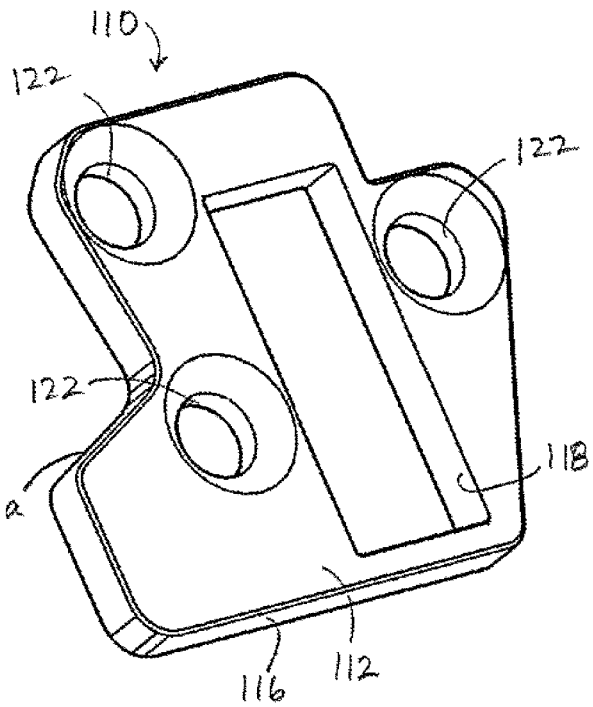
FIG. 13 is a perspective view of the latch plate of the connector assembly as seen from another perspective.
Figure 14:
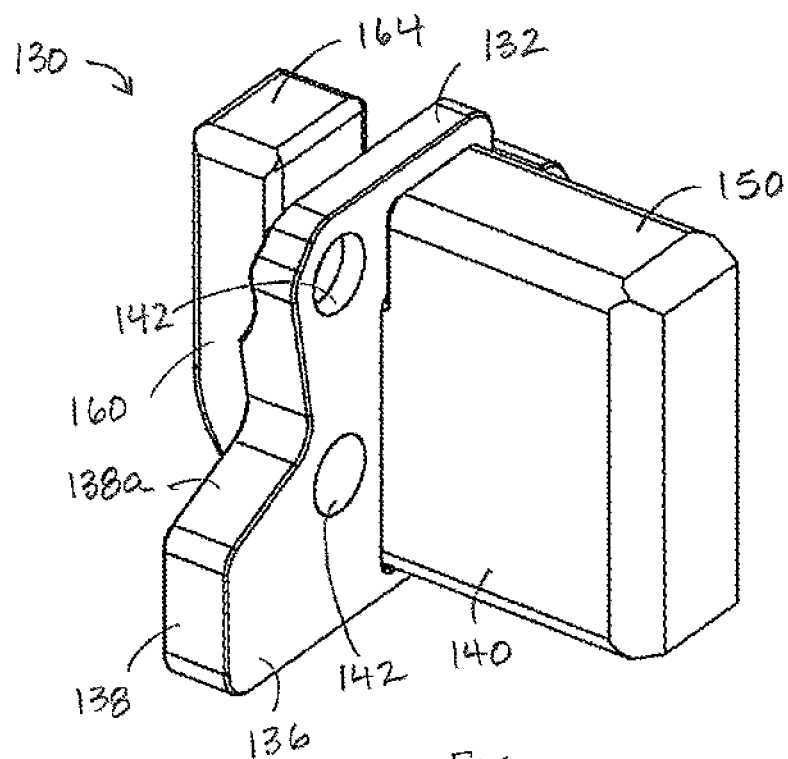
FIG. 14 is a perspective view of the hook of the connector assembly as seen from one perspective.
Figure 15:
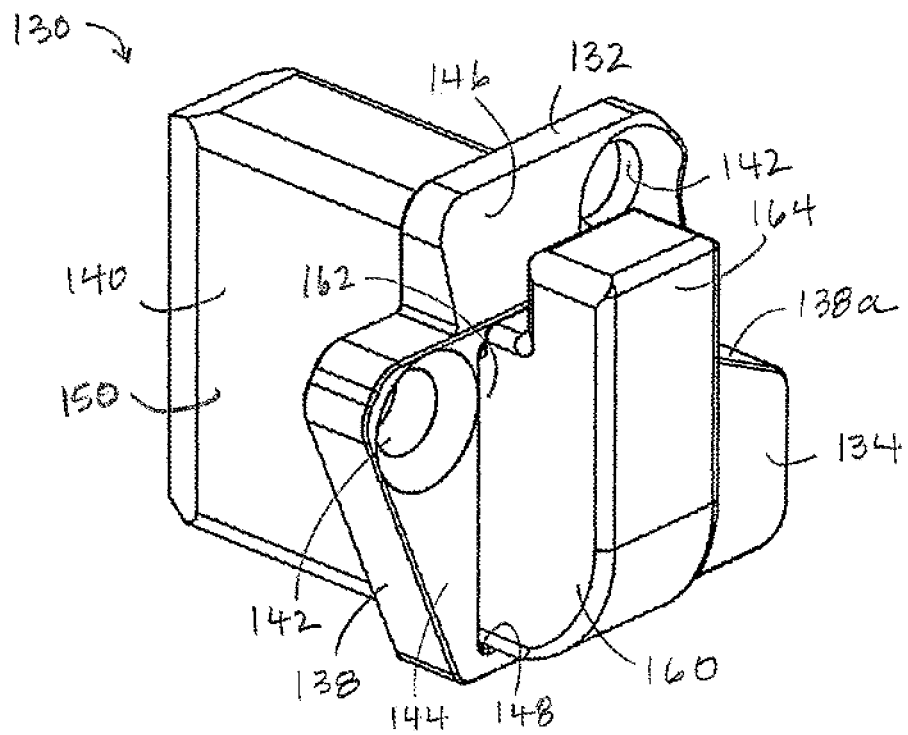
FIG. 15 is a perspective view of the hook of the connector assembly as seen from another perspective.

Referring to FIGS. 2 and 17, in use, the first extension rail 62 is connected to the first main rail 42 via the first connector assembly 100 in such a way that a) the first main rail 42 is arranged end-to-end with the first extension rail 62; b) the longitudinal axis 48 of the first main rail 42 is co-linear with the longitudinal axis 68 of the first extension rail 62, and c) the main fence contact surface 50 of the first main rail 42 is aligned with the extension fence contact surface 70 of the first extension rail 62. Similarly, the second extension rail 72 is connected to the second main rail 52 via the second connector assembly 102 in such a way that a) the second main rail 52 is arranged end-to-end with the second extension rail 72; b) the longitudinal axis 48 of the second main rail 52 is co-linear with the longitudinal axis 68 of the second extension rail 72, and c) the main fence contact surface 50 of the second main rail 52 is aligned with the extension fence contact surface 70 of the second extension rail 72.

Referring to FIGS. 3-15, the first and second connector assemblies 100, 102 are identical in form and function, and so only the first connector assembly 100 will be described in detail. The first connector assembly 100 includes a latch plate 110, and a hook 130 that is configured to engage with the latch plate 110.

The latch plate 110 is disposed on an end face of one of the main rail and the extension rail. For example, in the illustrated embodiment, the latch plate 110 is disposed on the end face 46*a* of the second end 46 of the first main rail 42. The latch plate 110 includes a hook-facing surface 112, and a first rail-facing surface 114 that is opposed to the hook-facing surface 112 and that abuts the end face 46*a* of the first main rail second end 46. The hook-facing surface 112 and the first rail-facing surface 114 are each planar, and are parallel to each other. The latch plate 110 includes a peripheral edge 116 that surrounds the latch plate 110 and extends between the hook-facing surface 112 and the first rail-facing surface 114.

The latch plate peripheral edge 116 includes a latch plate fence contact surface 116*a*. When the latch plate 110 is fixed to the end face 46*a*, the latch plate fence contact surface 116*a* is continuous with the main fence contact surface 50.

The latch plate 110 includes a latch plate opening 118 that extends between the hook-facing surface 112 and the first rail-facing surface 114, and is surrounded by the latch plate peripheral edge 116. The latch plate opening 118 is shaped and dimensioned to receive a protrusion 160 of the hook 130 in a tolerance fit. In the illustrated embodiment, the latch plate opening 118 is rectangular in shape, and is elongated in a direction that is parallel to the table first side 12. In addition, the latch plate 110 includes through holes 122 that receive fasteners (not shown) that secure the latch plate 110 to the end face 46*a* of the first main rail 42.

The hook 130 is disposed on an end face of the other one of the first main rail 42 and the first extension rail 62. In the illustrated embodiment, the hook 130 is disposed on the end face 64*a* of the first end 64 of the first extension rail 62. The hook 130 includes a mounting plate 132 and a catch 150 that is assembled with the mounting plate 132. The catch 150 engages with both the latch plate 110 and the first extension rail 62, as discussed further below.

The mounting plate 132 includes a latch plate-facing surface 134, and a second rail-facing surface 136 that is opposed to the latch plate-facing surface 134 and that abuts the end face 64*a* of the first extension rail first end 64.

The mounting plate 132 includes a peripheral edge 138 that that surrounds the mounting plate 132 and extends between the latch plate-facing surface 134 and the second rail-facing surface 136. The mounting plate peripheral edge 138 includes a mounting plate fence contact surface 138*a*. When the mounting plate 132 is fixed to the end face 64*a*, the mounting plate fence contact surface 138*a* is continuous with the latch plate fence contact surface 116*a* and the extension fence contact surface 70.

The mounting plate 132 includes a mounting plate opening 148 that extends between the latch plate-facing surface 134 and the second rail-facing surface 136, and is surrounded by the mounting plate peripheral edge 138. The mounting plate opening 148 is shaped and dimensioned to receive the protrusion 160 in a tolerance fit. In the illustrated embodiment, the mounting plate opening 148 is rectangular in shape, and is elongated in a direction that is parallel to the table first side 12. In addition, the mounting plate 132 includes through holes 142 that receive fasteners (not shown) that secure the mounting plate 132 to the end face 64*a* of the first end 64 of the first extension rail 62.

The second rail-facing surface 136 is planar. The lower portion 144 of latch plate-facing surface 134 (e.g., the portion 144 of latch plate-facing surface 134 that surrounds the mounting plate opening 148) is planar, and parallel to the second rail-facing surface 136. The upper portion 146 of the latch plate-facing surface 134 is angled such that a gap 104 exists between the latch plate 110 and the mounting plate 132 at this location. The gap 104 facilitates assembly of the latch plate 110 with the hook 130 by allowing the mounting plate 132 to be angled relative to the latch plate 110 while maintaining a close proximity between the mounting plate 132 and the latch plate 110, as occurs during the assembly.

The catch 150 is a rigid member that includes a shank 140 and the protrusion 160 that protrudes integrally from a latch plate-facing surface of the shank 140. The shank 140 is a rectangular prism that is elongated in a direction parallel to the longitudinal axis 68 of the extension rail 62. The insertion end of the shank 140 may be chamfered to ease assembly with the extension rail 62. The shank 140 is dimensioned so that the shank 140 extends in a direction parallel to the first extension rail longitudinal axis 68 (e.g., extends horizontally) a distance that is greater than the corresponding dimension of the protrusion 160. In addition, the shank 140 extends vertically a distance that slightly less than the corresponding dimension of the first extension rail 62. The shank 140 is close-fit within an opening 64b provided in the end face 64a of the first extension rail 62 to an extent that the second rail-facing surface 136 abuts the end face 64a of the first extension rail 62. By this configuration, the shank 140 facilitates secure and stable retention of the hook 130 on the first extension rail 62.

The protrusion 160 is generally J shaped and is dimensioned to engage the latch plate 110. The protrusion 160 includes a base portion 162 that adjoins the shank 140, and a lip portion 164 that extends at an angle from the base portion 162. More particularly, the base portion 162 protrudes from the latch plate-facing surface of the shank 140 in a direction perpendicular to latch plate-facing surface of the shank 140. The base portion 162 has a dimension in a direction parallel to the first extension rail longitudinal axis 68 that is sufficient to permit the base portion 162 to extend through both the mounting plate opening 148 and the latch plate opening 118. In addition, the base portion has a vertical dimension that is less than that of the shank 140. The lip portion 164 protrudes from the base portion 162 so as to extend in a direction parallel to the mounting plate 132 and toward an upper surface of the first extension rail 62.

When the hook 130 is assembled with the latch plate 110, the base portion 162 of the protrusion 160 protrudes through the mounting plate opening 148 and the latch plate opening 118, and the lip portion 164 and engages the first rail-facing surface 114 of the latch plate 110 in such a way that the hook 130 is retained on the latch plate 110 and the first extension rail longitudinal axis 68 is coaxial with the main rail longitudinal axis 48, and is parallel to the plane defined by the table work surface 8.

In this configuration, the load of the first and second extension rails 62, 72 and extension work surface 76, and of any material supported on these structures, is transmitted to the table 2 via the locations at which the hook 130 contacts the latch plate 110. In particular, load is transferred at three contact locations within the first connector assembly 100.

The first contact location corresponds to where a portion 162a of the protrusion 160 (e.g., a downward-facing surface 162a of the base portion 162) abuts an upward-facing portion 118a of the latch plate opening 118. At the first contact location, the weight of the first and second extension rails 62, 72, the extension work surface 76 and any work piece load atop it is transferred from the hook 130 to the latch plate 110.

The second contact location corresponds to where a mounting plate-facing portion 164a of the protrusion 160 (e.g., the mounting plate-facing portion 164a of the lip portion 164) abuts a portion 114a of the first rail-facing surface 114 of the latch plate 110. At the second contact location, axial loads and a bending moment are transferred.

The third contact location corresponds to where a portion 134a of the latch-plate facing surface 134 of the mounting plate 132 abuts a portion 112a of the hook-facing surface 112 of the latch plate 110. At the third contact location, axial loads and a bending moment are transferred. In addition, by providing a set screw (not shown) in either contact surface of the third contact location would provide adjustability in the alignment of the first main rail 42 and the first extension rail 62.

At each contact location, loads are transferred over a large surface area (e.g., the contact location is two dimensional), whereby the connection between the latch plate 110 and the hook 130 is reliable and stable, and relative motion between the latch plate 110 and the hook 130 is minimal.

When the hook 130 is assembled with the latch plate 110 as described above, the mounting plate fence contact surface 138a is continuous with the latch plate fence contact surface 116a. As a result, the first main rail 42, the first connector assembly 100 and the first extension rail 62, and the second main rail 52, the second connector assembly 102 and the second extension rail 72 each cooperate to provide a continuous fence contact surface that extends along the entire length of the table top and the extension assembly. This permits the fence 34 to be moved away from the blade 26 a distance that is limited only by the length of the extension rails 62, 72.

The extension assembly 60 is assembled with, and disassembled from, the table top 6 by connecting the hook 130 of each connector assembly 101, 102 with the corresponding latch plate 110. The method of forming a connection between the latch plate 110 and the hook 130 of the first connector assembly 101 is the same as the method of forming a connection between the latch plate 110 and the hook 130 of the second connector assembly 102, so only the method of forming a connection between the latch plate 110 and the hook 130 of the first connector assembly 101 will be described. Disconnection is achieved by reversing the method.

The extension assembly 60 is assembled with the table top 6 by holding the first extension rail 62 including the hook 130 at an angle relative to the first main rail 42 including the latch plate 110, and inserting the lip portion 164 of the protrusion 160 into the latch plate opening 118. To achieve the relatively angled position, the first end 64 of the first extension rail 62 is positioned adjacent to, and at the same height as, the second end 46 of the first main rail 42, and the second end 66 of the first extension rail 62 is positioned higher than the first end 64 of the first extension rail 62. Following insertion of the lip portion 164 into the latch plate opening 118, the first extension rail 62 including the hook 130 is pivoted until the longitudinal axis of the first extension rail 62 is aligned with the longitudinal axis of the first main rail 42 (e.g., the second end 66 of the first extension rail 62 is lowered). As a result, the hook 130 pivots relative to the latch plate 110 to a position in which the protrusion 160 protrudes through the latch plate opening 118 and the lip portion 164 engages the first rail-facing surface 114 of the latch plate 110. The gap 104 provides a clearance in the connection that allows for the pivoting action.

The assembly of the extension assembly 60 with the table top 6 is easily achieved, and is accomplished without fasteners and without requiring the use of tools. Moreover, the effect of gravity on the extension assembly 60 provides a bending moment that serves to retain the hook 130 on the latch plate 110.

Referring to FIGS. 16 and 17, when the extension assembly 60 is connected to the second ends 46, 46 of the first and second main rails 42, 52, the extension assembly 60 is cantilevered from the table top 6 on one side (for example, the right side, with respect to the orientation of the table saw illustrated in FIGS. 1 and 16) of the table top 6. In this configuration, the cutting dimension of the table saw 1 is increased as compared to a cutting dimension of the table saw 1 when no extension is used.

Referring to FIGS. 18 and 19, an alternative embodiment table saw 200 includes the extension assembly 60 positioned on the other side (for example, the left side, with respect to the orientation of the table saw illustrated in FIGS. 1 and 18) of the table top 6. This is achieved by providing a latch plate on the first ends 44, 44 of the first and second main rails 42, 52, and connecting the extension assembly 60 to the first ends 44, 44, of the first and second main rails 42, 52.

Referring to FIGS. 20 and 21, another alternative embodiment table saw 300 includes the extension assembly 60 (referred hereafter as the "cantilevered extension assembly 60") positioned on the right side of the table top 6, with a supported extension assembly 360 disposed between the table top and the cantilevered extension assembly 60. In this configuration, the supported extension assembly 360 joins the cantilevered extension assembly 60 to the table top 6, and the cutting dimension of the table saw 1 is increased as compared to a cutting dimension of the table saw 1 when the cantilevered extension assembly 60 alone is used. The supported extension assembly 360 is similar to the cantilevered extension assembly 60 described above, and common reference numbers will be used to refer to common elements. The supported extension assembly 360 includes first and second extension rails 62', 72' that support the extension work surface 76'. In addition, the supported extension assembly 360 includes first and second connector assemblies 100', 102'. The first connector assembly 100' mechanically connects the first extension rail 62' to the first main rail 42', and the second connector assembly 102' mechanically connects the second extension rail 72' to the second main rail 52'. In this embodiment, the first and second connector assemblies 100, 102 of the cantilevered extension assembly 60 are used to connect the cantilevered extension assembly 60 to an end of the supported extension assembly 360 that is opposed to the table top 6. In this configuration, the table work surface 8, the supported extension work surface 76' and the cantilevered extension work surface 76 are coplanar, and provide a substantially continuous surface on which the material can rest. In addition, the fence contact surfaces 50, 50 of the first and second main rails 42, 52, the fence contact surfaces 70', 70' of the first and second extension rails 62', 72' of the supported extension assembly 360 and the fence contact surfaces 70, 70 of the first and second extension rails 62, 72 of the cantilevered extension assembly 60 are substantially continuous.

The supported extension assembly 360 differs from the cantilevered extension assembly 60 in that it includes at least one support leg 362 that extends between the ground 3 (e.g., a "support surface") and the work surface 76' of the supported extension assembly 360. In the illustrated embodiment, the supported extension assembly 360 includes two legs (only one is shown) 362, each leg 362 being disposed at a location spaced apart from the table top 6, for example adjacent to a second end 66' of a respective first and second extension rail 62', 72'.

Referring to FIGS. 22 and 23, another alternative embodiment table saw 400 includes the cantilevered extension assembly 60 disposed on the right side of the table top 6, and the supported extension assembly 360 disposed on the left side of the table top 6. In this configuration, the cutting dimension of the table saw 1 is increased as compared to a cutting dimension of the table saw 1 when the cantilevered extension assembly 60 alone is used. As in the previous embodiment, the table work surface 8, the supported extension work surface 76' and the cantilevered extension work surface 76 are coplanar, and provide a substantially continuous surface on which the material can rest. In addition, the fence contact surfaces 50, 50 of the first and second main rails 42, 52, the fence contact surfaces 70', 70' of the first and second extension rails 62', 72' of the supported extension assembly 360 and the fence contact surfaces 70, 70 of the first and second extension rails 62, 72 of the cantilevered extension assembly 60 are substantially continuous.

The configurations of the cantilevered extension assembly 60 and/or the supported extension assembly 360 with respect to the table top 6 are not limited to the embodiments described above. For example, it is contemplated that the supported extension assembly 360 may be connected to the table top 6 with the cantilevered extension table omitted (not shown).

Although in the illustrated embodiments, the cantilevered extension assembly 60 and/or the supported extension assembly 360 is retained in connection with the table top 6 solely via the connector assemblies 100, 102, 100', 102', the table saw is not limited to this configuration. For example, in some embodiments, a lock mechanism (not shown) may be used in combination with the connector assemblies 100, 102, 100', 102' to secure the cantilevered extension assembly 60 and/or the supported extension assembly 360 to the table top 6.

Although in the illustrated embodiment, the frame 4 comprises foldable tubular support structure, in other embodiments, the frame 4 may include a set of four conventional table legs or a cabinet. In still other embodiments, the frame 4 may be omitted, and the table top 6 may rest on a conventional table.

In the illustrated embodiment, the hook 130 is an assembly of the catch 150 with the mounting plate 132. However, it is understood that the hook 130 may be formed as a monolithic structure in which the catch 150 is formed integrally with the mounting plate 132.

In the illustrated embodiment, the latch plate 110 includes the latch plate opening 118 that extends between the hook-facing surface 112 and the first rail-facing surface 114, and is surrounded by the latch plate peripheral edge 116. However, the latch plate 110 is not limited to this configuration. For example, in some embodiments, the latch plate 110 may be a smaller plate that is opening free, and covers only a portion of the rail open end. In other embodiments, the latch plate 110 may be replaced by another sort of catch mechanism that engages the hook 130, such as a pin having a square or circular cross-section.

Selective illustrative embodiments of the portable table saw are described above in some detail. It should be understood that only structures considered necessary for clarifying certain features of the table saw have been described herein. Other conventional structures, and ancillary and auxiliary components of the portable table saw, are assumed to be known and understood by those skilled in the art. Moreover, while a working example of the portable table saw has been described above, the portable table saw is not limited to the working example described above, but various design alterations may be carried out without departing from the portable table saw as set forth in the claims.

I claim:

1. A connector assembly configured to connect an end of a first rail to an end of a second rail, the connector assembly comprising:
    a latch plate that is disposed on an end face of one of the first rail and the second rail, the latch plate including:
        a hook-facing surface;
        a first rail-facing surface that faces away from the hook-facing surface and that abuts the end face of the one of the first rail and the second rail; and
        a latch plate opening that extends between the hook-facing surface and the first rail-facing surface; and
    a hook that protrudes from an end face of the other of the first rail and the second rail, the hook comprising a mounting plate and a curved protrusion that protrudes from the mounting plate, the mounting plate being secured to the end face of the other of the first rail and the second rail, the mounting plate having
    a latch plate-facing surface, and
    a second rail-facing surface that faces away from the latch plate-facing surface and that abuts the end face of the other of the first rail and the second rail,
    the protrusion protruding from the mounting plate, extending through the latch plate opening and engaging the first rail-facing surface of the latch plate,
wherein
    the protrusion engages the first rail-facing surface of the latch plate in such a way that the hook is retained on the latch plate, and
    a longitudinal axis of the second rail is parallel to a longitudinal axis of the first rail.

2. The connector assembly of claim 1, wherein the protrusion is configured so that when the profusion is engaged with the latch plate, a portion of the mounting plate abuts a portion of the latch plate and a portion of the protrusion abuts a portion of the latch plate opening.

3. The connector assembly of claim 2, wherein
    the portion of the mounting plate, the portion of the latch plate, the portion of the protrusion and
    the portion of the latch plate opening each comprise a two dimensional surface.

4. The connector assembly of claim 1, wherein the protrusion is configured so that when the protrusion is engaged with the latch plate,
    a portion of the latch-plate facing surface of the mounting plate abuts a portion of the hook-facing surface of the latch plate,
    a mounting plate-facing portion of the protrusion abuts a portion of the first rail-facing surface of the latch plate, and
    a portion of the protrusion abuts a portion of the latch plate opening.

5. The connector assembly of claim 1, wherein a latch plate-facing surface of the mounting plate includes an angled portion whereby a gap exists between the latch plate and a portion of the mounting plate.

6. The connector assembly of claim 1, wherein the hook comprises an assembly of the mounting plate and a catch, where the catch includes the protrusion.

7. A table saw comprising;
    a table work surface, the table work surface including an opening that is configured to receive a cutting blade, and a first side, a second side, a third side and a fourth side that surround the table work surface;
    a main rail supported on the first side;
    an extension assembly including an extension rail and a connector assembly that is configured to couple the extension rail to the main rail,
    a fence supported on one of the main rail and the extension assembly so as to be slidable relative to the table top,
wherein
the connector assembly includes:
    a latch plate that is disposed on an end face of one of the main rail and the extension rail, the latch plate including:
        a hook-facing surface;
        a first rail-facing surface that faces away from the hook-facing surface and that abuts the end face of the one of the main rail and the extension rail; and
        a latch plate opening that extends between the hook-facing surface and the first rail-facing surface; and
    a hook that protrudes from an end face of the other of the first rail and the second rail, the hook comprising a mounting plate and a curved protrusion that protrudes from the mounting plate, the mounting plate being secured to the end face of the other of the main rail and the extension rail, the mounting plate having
        a latch plate-facing surface, and
        a second rail-facing surface that faces away from the latch plate-facing surface and that abuts the end face of the other of the main rail and the extension rail,
        the protrusion protruding from the mounting plate, extending through the latch plate opening and engaging the first rail-facing surface of the latch plate,
    wherein the protrusion engages the first rail-facing surface of the latch plate in such a way that the hook is retained on the latch plate, and
    a longitudinal axis of the extension rail is parallel to a plane defined by the table work surface.

8. The table saw of claim 7, wherein the longitudinal axis of the extension rail is parallel to a longitudinal axis of the main rail.

9. The table saw of claim 7, wherein the protrusion is configured so that when the protrusion is engaged with the latch plate, a portion of the mounting plate abuts a portion of the latch plate and a portion of the protrusion abuts a portion of the latch plate opening.

10. The table saw of claim 9, wherein
    the portion of the mounting plate, the portion of the latch plate, the portion of the protrusion and the portion of the latch plate opening each comprise a two dimensional surface.

11. The table saw of claim 7 wherein the protrusion is configured so that when the protrusion is engaged with the latch plate,
    a portion of the latch-plate facing surface of the mounting plate abuts a portion of the hook-facing surface of the latch plate,
    a mounting plate-facing portion of the protrusion abuts a portion of the first rail-facing surface of the latch plate, and
    a portion of the protrusion abuts a portion of the latch plate opening.

12. The table saw of claim 7, comprising an extension work surface that is supported on the extension rail so as to be coplanar with the table work surface.

13. The table saw of claim 12, wherein
    the table work surface is supported relative to a support surface via a support structure, and
    the extension assembly includes a support leg that is connected to the extension work surface, and can be configured to extend between the extension rail and the support surface.

14. The table saw of claim 7, wherein the extension rail is cantilevered from the main rail via the connector assembly.

15. The table saw of claim 7, wherein
    the main rail is a first main rail, and the table saw includes a second main rail that is supported on the third side of the table work surface,
    the extension rail is a first extension rail, and the extension assembly includes a second extension rail,
    the connector assembly is a first connector assembly that couples the first extension rail to the first main rail, and the extension assembly includes a second connector assembly that couples the second extension rail to the second main rail, the second connector assembly including:
a latch plate that is disposed on an end face of one of the second main rail and the second extension rail; and
a hook that protrudes from an end face of the other of the second main rail and the second extension rail, the hook comprising a curved protrusion, wherein
the protrusion engages a rail-facing surface of the latch plate in such a way that the hook is retained on the latch plate and
a longitudinal axis of the second main rail is parallel to a longitudinal axis of the second extension rail.

16. The table saw of claim 15, comprising an extension work surface that is supported on the first extension rail and the second extension rail so as to be coplanar with the table work surface.

17. The table saw of claim 7, wherein
the main rail and the extension rail each comprise a contoured surface configured to engage with a rail contact surface of the fence,
a peripheral edge of each of the latch plate and the mounting plate includes a contoured portion having the same profile as the contoured surface of the main rail and the extension rail, and
the contoured portion of the latch plate and the mounting plate peripheral edge cooperate with the contoured surface of the main rail and the extension rail to provide a continuous fence contact surface that is configured so that the fence is slidable along the both the main rail and the extension rail.

18. A table saw kit, comprising:
a table saw; and
an extension table,
wherein
the table saw includes:
a table work surface, the table work surface including an opening that is configured to receive a cutting blade;
a first main rail supported on one side of the table work surface;
a second main rail supported on a second side of the table work surface, where the second side is on a side of the table work surface that is opposed to the first side; and
a fence mounted on the first main rail and the second main rail so as to be slidable relative to the table work surface,
the extension table includes:
a first extension rail;
a second extension rail that extends in parallel to the first extension rail,
an extension work surface that extends between, and is supported on, the first extension rail and the second extension rail in such a way that the extension work surface is co-planar with the table work surface,
a first connector assembly that is configured to connect the first extension rail to the first main rail;
a second connector assembly that is configured to connect the second extension rail to the second main rail;
wherein the first connector assembly and the second connector assembly each comprise:
a latch plate that is disposed on an end face of one of the main rail and the extension rail, the latch plate including:

a hook-facing surface;
a first rail-facing surface that faces away from the hook-facing surface and that abuts the end face of the one of the main rail and the extension rail; and
a latch plate opening that extends between the hook-facing surface and the first rail-facing surface; and
a hook that protrudes from an end face of the other of the first rail and the second rail, the hook comprising a mounting plate and a curved protrusion that protrudes from the mounting plate, the mounting plate being secured to the end face of the other of the main rail and the extension rail, the mounting plate having
a latch plate-facing surface, and
a second rail-facing surface that faces away from the latch plate-facing surface and that abuts the end face of the other of the main rail and the extension rail,
the protrusion protruding from the mounting plate, extending through the latch plate opening and engaging the first rail-facing surface of the latch plate,
wherein the protrusion engages the first rail-facing surface of the latch plate in such a way that the hook is retained on the latch plate, and
a longitudinal axis of the extension rail is parallel to a plane defined b the table work surface.

19. The table saw kit of claim 18, wherein the extension table is cantilevered from the table saw via the first and second connector assemblies.

20. The table saw kit of claim 18 wherein
the extension table is connected to the table saw via the first connector assembly and the second connector assembly,
the table work surface is supported relative to a support surface via a support structure, and
the extension table includes a support leg that is connected to the extension work surface, and can be configured to extend between the extension work surface and the support surface.

21. The table saw kit of claim 18, wherein
the extension table is a cantilevered extension table that is cantilevered from the table saw via the first and second connector assemblies,
the table saw kit includes a supported extension table that includes:
a third extension rail;
a fourth extension rail that extends in parallel to the third extension rail,
a supported extension work surface that extends between, and is supported on, the third extension rail and the fourth extension rail in such a way that the supported extension work surface is co-planar with the table work surface,
a support leg that is connected to the supported extension work surface, and can be configured to extend between the supported extension work surface and a support surface,
a third connector assembly that is configured to connect the third extension rail to one of the first main rail and the first extension rail;
a fourth connector assembly that is configured to connect fourth extension rail to one of the second main rail and the second extension rail.

* * * * *